(12) United States Patent
Chaar et al.

(10) Patent No.: US 7,274,925 B2
(45) Date of Patent: Sep. 25, 2007

(54) METHODS AND APPARATUS FOR FLEXIBLE COMMUNICATION DEVICE USAGE ATTRIBUTION

(75) Inventors: Jarir Kamel Chaar, Tarrytown, NY (US); Rosemarie M. Gratz, Putnam Valley, NY (US); Dimitri Kanevsky, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 10/976,514

(22) Filed: Oct. 29, 2004

(65) Prior Publication Data

US 2006/0094398 A1 May 4, 2006

(51) Int. Cl.
*H04M 11/00* (2006.01)
*H04M 15/00* (2006.01)
(52) U.S. Cl. ............... 455/405; 455/406; 455/409; 455/410; 455/411; 379/111; 379/114.15; 379/114.2; 379/121.03
(58) Field of Classification Search ........... 455/405, 455/406, 407, 408, 409, 410, 411; 379/111, 379/114.15, 114.2, 121.03
See application file for complete search history.

(56) References Cited

U.S. PATENT DOCUMENTS

| 6,421,453 | B1  |   | 7/2002  | Kanevsky et al. |
|-----------|-----|---|---------|-----------------|
| 6,542,731 | B1  | * | 4/2003  | Alos ............. 455/411 |
| 6,885,877 | B1  | * | 4/2005  | Ozaki et al. ...... 455/556.1 |
| 2002/0098828 | A1 | * | 7/2002  | Wakil et al. ........ 455/408 |
| 2002/0165008 | A1 | * | 11/2002 | Sashihara et al. ..... 455/558 |
| 2003/0004897 | A1 | * | 1/2003  | Smith ............ 705/76 |
| 2006/0058064 | A1 | * | 3/2006  | Satou ............. 455/558 |

* cited by examiner

*Primary Examiner*—George Eng
*Assistant Examiner*—Huy Phan
(74) *Attorney, Agent, or Firm*—Anne V. Dougherty; Ryan, Mason & Lewis, LLP

(57) ABSTRACT

A technique for providing flexible communication device usage attribution is provided. Identification information of a user of a communication device is received from the communication device at a primary service provider. It is determined if the user of the communication device is the owner of the communication device at the primary service provider. Usage information is attributed to an account of the owner on the primary service provider when the user is identified as the owner. Usage information is attributed to an account of the user when the user is not identified as the owner and the user is subscribed to one of the primary service provider and a service provider associated with the primary service provider.

20 Claims, 3 Drawing Sheets

METHODS AND APPARATUS FOR FLEXIBLE COMMUNICATION DEVICE USAGE ATTRIBUTION

FIELD OF THE INVENTION

The present invention is related to techniques for sharing a communication device and, more particularly, for flexibly attributing mobile phone usage information among different users.

BACKGROUND OF THE INVENTION

Typically a user of a mobile phone has registered with or subscribed to a service provider, which in most cases also issues the mobile phone. In subscribing to the service provider, a specific agreement or service plan is set forth as to the charges for mobile phone usage. In some cases a monthly fee is charged, which may provide the user with limited usage lengths during some specified times of the day, and may also provide unlimited usage lengths during other specified times of the day. Should a user exceed any limited usage length, the user is typically billed an extra amount in addition to the standard monthly fee. This extra amount is sometimes significant, and typically correlates to the amount of time the user exceeded the limited usage specified in the service plan of the service provider. Thus, an owner of a mobile phone pays close attention to the time of day the phone is used and the length of time it is in use.

For example, when a person borrows the mobile phone of another, the usage information relating to the call is attributable to the account of the owner on the subscribed service provider, and not an account of the borrower. When the usage information exceeds lengths specified in the service plan of the owner, the owner is charged for the extra time. In borrowing a landline telephone, this problem may be solved through the use of a collect call. Currently, mobile phones have no such solution.

Furthermore, when borrowing a mobile phone, the personal settings on the mobile phone, such as, for example, an address book, are those of the owner and not the borrower. Thus, if the borrower owns a mobile phone, any personal settings or information stored on the borrower's mobile phone are not accessible from the borrowed mobile phone. This contributes to the personalization of a mobile phone to a single user and the difficulty in borrowing a mobile phone.

Mobile phones have become personalized to such an extent that they are unable to be borrowed without negative consequences for the owner of the mobile phone and the borrower of the mobile phone.

SUMMARY OF THE INVENTION

The present invention provides techniques for sharing a mobile phone and, more particularly, techniques for providing flexible mobile phone usage attribution.

For example, in one aspect of the invention, a technique for providing flexible communication device usage attribution is provided. Identification information of a user of a communication device is received from the communication device at a primary service provider. It is determined at the primary service provider whether the user of the communication device is the owner of the communication device. Usage information is attributed to an account of the owner on the primary service provider when the user is identified as the owner. Usage information is attributed to an account of the user when the user is not identified as the owner and the user is subscribed to one of the primary service provider and a service provider associated with the primary service provider.

In an additional aspect of the invention, it is determined whether the nonowner user is subscribed to the primary service provider. Usage information is attributed to the account of the user on the primary service provider when the user is subscribed to the primary service provider. It is determined whether the user is subscribed to a service provider associated with the primary service provider when the user is not subscribed to the primary service provider. Usage information is sent to the service provider associated with the primary service provider when the user is subscribed to the service provider associated with the primary service provider.

Advantageously, the present invention provides a system in which a mobile phone may be used by a person other than the owner without attributing usage information to the account of the owner of the mobile phone. This may be accomplished through identification techniques of the mobile phone and service provider, as well as contractual relationships between different service providers to allow for mobile phone borrowing. Further, a mobile phone may incorporate the personal settings and information of the borrower to provide for easier use when the mobile phone is borrowed.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

As will be illustrated in detail below, the present invention introduces techniques for sharing a mobile phone and, more particularly, techniques for flexibly attributing a mobile phone's usage information to different users. The phrase "usage information" as used herein is intended to illustratively include identification information, and time and length of mobile phone usage. The phrase "mobile phone" is intended to illustratively include any non-landline phone regardless of the technology, such as, for example, cellular, satellite, etc. However, the invention may also be implemented in additional types communication devices.

Figure 1:
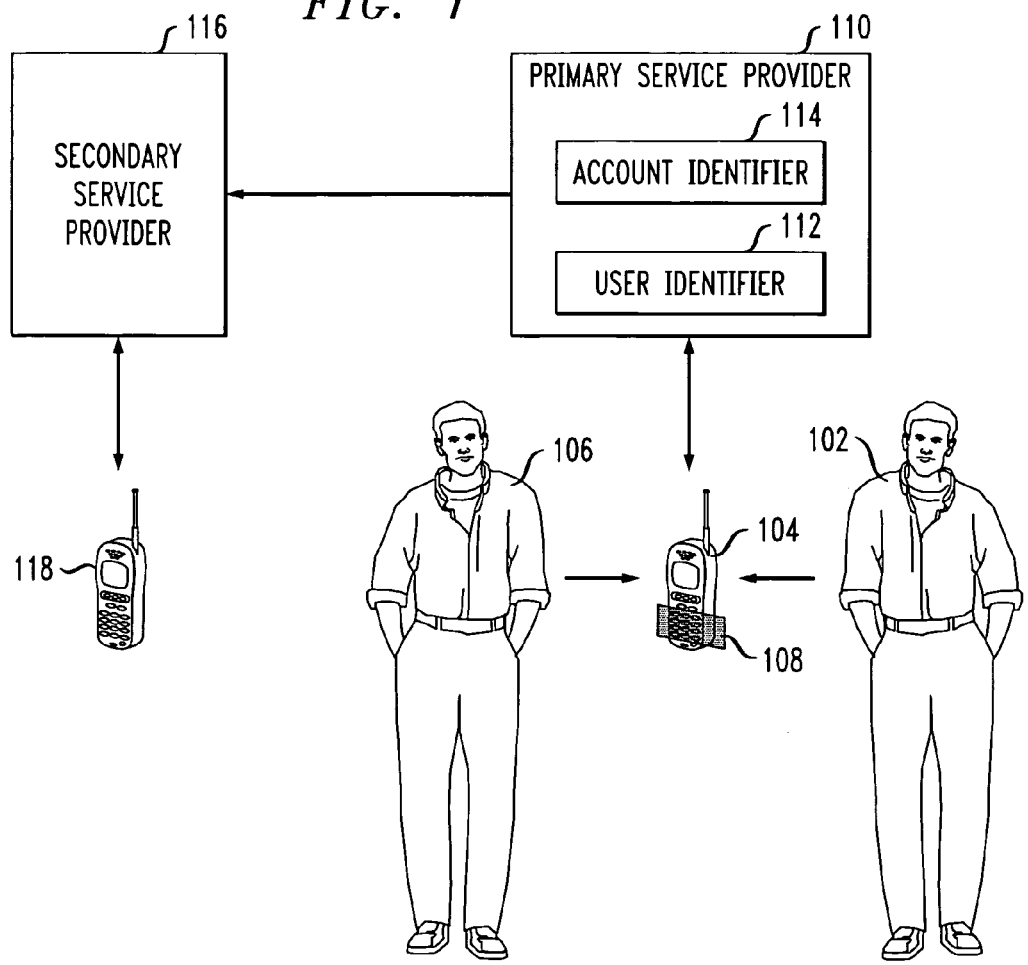
FIG. 1 is a block diagram illustrating a flexible mobile phone usage attribution system, according to an embodiment of the present invention.

Referring initially to FIG. 1, a block diagram illustrates a flexible mobile phone usage attribution system, according to an embodiment of the present invention. Owner 102 is the owner of mobile phone 104. Borrower 106 may borrow mobile phone 104 from owner 102. Mobile phone 104 has biometric sensors 108, which detect the actual user of mobile phone 104. Examples of biometric sensors may include a fingerprint detection device or a voice detection device for a voice recognition system. See, for example, U.S. Pat. No. 6,421,453, which describes biometric sensors and recognition employing behavioral passwords. Borrower 106 may be identified through the information sent from biometric sensors 108, or borrower 106 may enter an identification code into mobile phone 104. This identification information is sent to a primary service provider 110 for mobile phone 104. Primary service provider 110 is the service provider that owner 102 has subscribed to, and on which owner 102 has a service plan and respective account.

Primary service provider 110 includes a user identifier 112 and an account identifier 114. The information from biometric sensors 108 or the identification code is fed to user identifier 112, in order to identify the user. Once the user is identified, account identifier 114 determines what account the mobile phone usage information should be attributed to. If user identifier 112 identifies the user as owner 102, account identifier 114 attributes the usage information to the account of owner 102 in primary service provider 110.

Should user identifier 112 identify the user as someone other than owner 102, such as, for example borrower 106, account identifier 114 may attribute the usage information to the account of borrower 106, if borrower 106 has subscribed to primary service provider 110. However, when borrower 106 is not subscribed to primary service provider 110, primary service provider 110 may contact a secondary service provider 116 that is associated with primary service provider 110, if borrower 106 has subscribed to secondary service provider 116. Typically, if borrower 106 is subscribed to secondary service provider 116, borrower 106 has a mobile phone 118 through secondary service provider 116. Primary service provider 110 asks secondary service provider 116 to pay primary service provider 110 some agreed upon amount for the service. If secondary service provider 116 confirms, primary service provider 110 provides the service for borrower 106.

Secondary service provider 116 attributes usage information from mobile phone 104 to the account of borrower 106, and determines how and whether to charge borrower 106 based on the service plan borrower 106 has with secondary service provider 116. For example, if borrower 106 has a service plan that allows for some amount of free minutes based on a monthly fee, borrower 106 would not be charged for the use of mobile phone 104 when borrower 106 is still within the amount of free minutes. However, when the free minutes have been used or when there were no free minutes in the service plan, secondary service provider 116 charges borrower 106 a rate defined by the service plan. Fees may be added in either case in order to compensate primary service provider 110, depending on the contractual relationship between primary service provider 110 and secondary service provider 116.

In another example that may utilize this embodiment of the present invention, a group of people may speak in turn into the mobile phone during a single call. When the speaker changes, the primary service provider detects the change in identity, and usage information is attributed to an account of the current speaker. Thus, during a single call, usage information may be attributed to multiple people and the usage information is dependent on how long each person spoke. In this example the primary service provider of the mobile phone would be able to detect a change in the speaker through voice recognition. The primary service provider may also use a fingerprint identification system, however, this would require that the person speaking is always holding the mobile phone.

A similar example enables multiple users to use multiple mobile phones during a single call. Again, usage information may be attributed to multiple people depending on how long each person spoke during the call.

Figure 2:
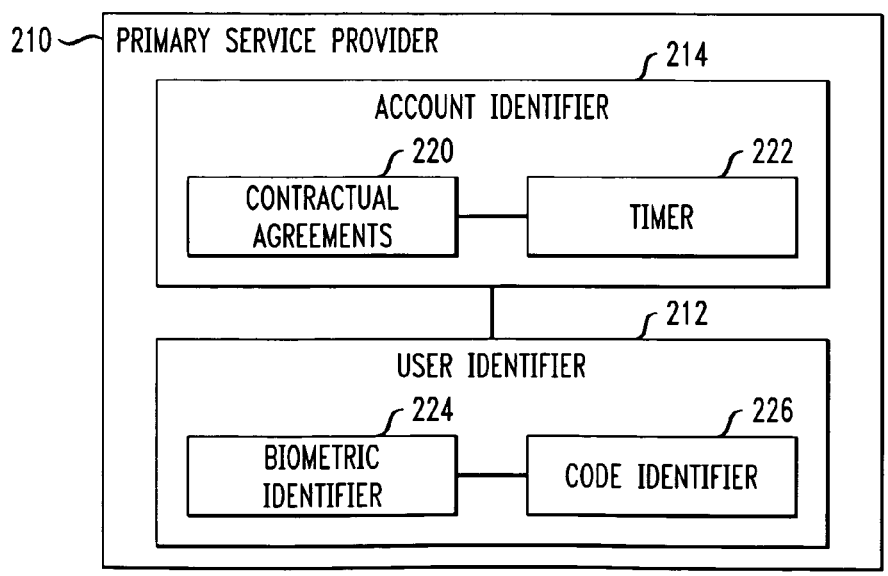
FIG. 2 is a block diagram illustrating a primary service provider of a mobile phone usage attribution system, according to an embodiment of the present invention.

Referring now to FIG. 2, a block diagram illustrates a primary service provider 210 of a flexible mobile phone usage attribution system, according to an embodiment of the present invention. This may be considered a detailed description of element 110 in FIG. 1. Primary service provider 210 comprises a user identifier 212 and an account identifier 214. Account identifier 214 contains information regarding contractual agreements 220 with other service providers for the flexible mobile phone usage attribution system. Account identifier 214 also includes a timer 222 used to determine the length and time of mobile phone usage. Account identifier 214 is in communication with user identifier 212.

User identifier 212 contains a biometric identifier 224, which determines the type of biometric information sent to primary service provider 210 and attempts to identify a user based on this biometric information. User identifier 212 further contains a code identifier 226, which determines the identity of a user based on an identification code fed through the mobile phone to primary service provider 210.

Figure 3:
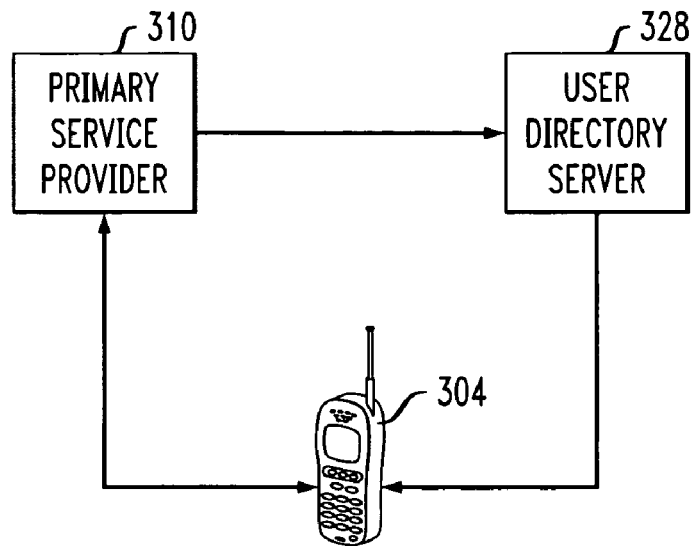
FIG. 3 is a block diagram illustrating a user directory server incorporated with a mobile phone usage attribution system, according to an embodiment of the present invention.

Referring now to FIG. 3, a block diagram illustrates a user directory server incorporated in a flexible mobile phone usage attribution system, according to an embodiment of the present invention. When a user is borrowing a mobile phone, the borrowed phone does not include any of the personal preferences, information or settings of the borrower. These personal settings may be stored on the borrower's personal mobile phone. In this embodiment of the present invention, a user directory server 328 contains information regarding personal settings of those subscribed to one of the service providers contracted to provide flexible mobile phone usage attribution. The personal settings contained in user directory server 328 may include only those personal settings that each subscriber has permitted to be shared in the directory.

When mobile phone 304 is borrowed, primary service provider 310 may communicate with user directory server 328. Primary service provider 310 may send user directory server 328 user identification information sent from mobile phone 304. In response to this communication, user directory server 328 may send stored personal preferences, information and settings of the borrower of mobile phone 304 directly to mobile phone 304. In another embodiment, user directory server 328 may send the stored personal settings through primary service provider 310 to mobile phone 304. Alternatively, personal settings may also be transmitted directly from a service provider of the user associated with primary service provider 310, to primary service provider 310 for transmission to mobile phone 304.

Figure 4:
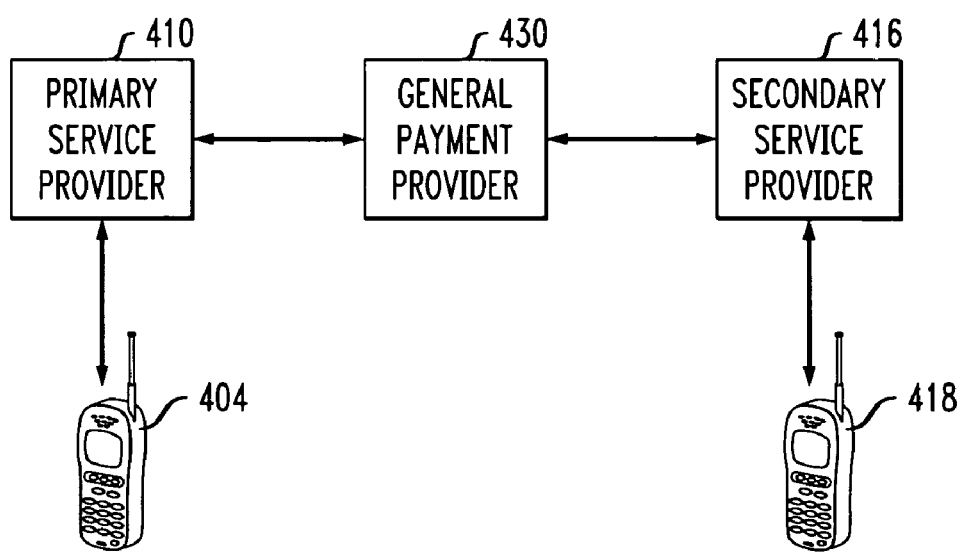
FIG. 4 is a block diagram illustrating a general payment provider incorporated with a mobile phone usage attribution system, according to an embodiment of the present invention.

Referring now to FIG. 4, a block diagram illustrates a general payment provider incorporated in a flexible mobile phone usage attribution system, according to an embodiment of the present invention. This embodiment of the present invention may be applicable in situations where the user of mobile phone 404 is subscribed to secondary service provider 416, and secondary service provider 416 is not a service provider that has a contractual relationship with primary service provider 410 for flexible mobile phone usage attribution. These situations would typically present a problem in properly attributing mobile phone usage information to an account on secondary service provider 416 as opposed to the account of the owner of mobile phone 404 on primary service provider 410.

When primary service provider 410 determines that the borrower of mobile phone 404 is a subscriber of service plan not in a contractual agreement to provide flexible mobile phone usage attribution, primary service provider 410 communicates with general payment provider 430. General payment provider 430 pays primary service provider 410 for the use of mobile phone 404. General payment provider 430 then contacts secondary service provider 416 for reimbursement of this payment. Secondary service provider 416 may then attribute the usage information to the borrower of mobile phone 404, or owner of mobile phone 418. Secondary service provider 416 may charge the borrower, depending on the service plan the borrower has with secondary service provider 416. Alternatively, general payment provider 430 may contact the borrower of mobile phone 404 directly for reimbursement of the payment.

As another alternative embodiment, primary service provider 410 may contact general payment provider 430 indicating an amount needed for payment. General payment provider 430 then contacts secondary service provider 416 to obtain a payment for the use of mobile phone 404 on primary service provider 410. After receiving payment, general payment provider 430 may provide proper payment to primary service provider 410.

Figure 5:
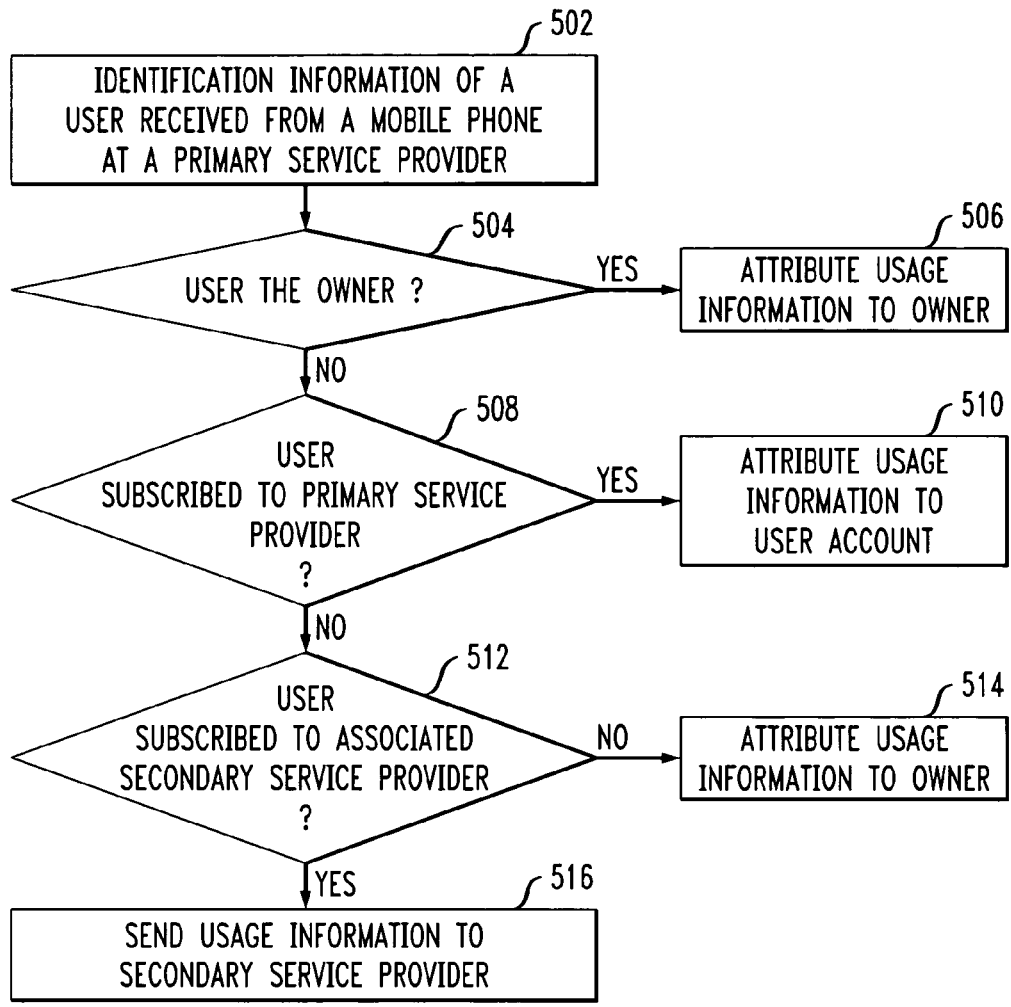
FIG. 5 is a flow diagram illustrating a flexible mobile phone usage attribution methodology, according to an embodiment of the present invention.

Referring now to FIG. 5, a flow diagram illustrates a flexible mobile phone usage attribution methodology, according to an embodiment of the present invention. The methodology begins in block 502 where identification information of a user of a mobile phone is received from the mobile phone at a primary service provider. In block 504, it is determined whether the user is the owner of the mobile phone and thus the subscriber to the primary service provider. If the user is identified as the owner of the mobile phone, the usage information of the mobile phone is attributed to the account of the owner on the primary service provider in block 506, and methodology terminates.

If the user is not identified as the owner, and thus may be a borrower of the mobile phone, it is determined whether the borrower is subscribed to the primary service provider in block 508. If the borrower is subscribed to the primary service provider, the usage information of the mobile phone is attributed to the account of the borrower on the primary service provider in block 510, and the methodology terminates. If the borrower is not subscribed to the primary service provider, it is determined whether the borrower is subscribed to an associated secondary service provider in block 512.

An associated secondary service provider may be a service provider in a contractual relationship with the primary service provider to provide flexible mobile phone usage attribution to its subscribers. If the borrower is not subscribed to an associated secondary service provider, the usage information may be attributed to the account of the owner of the mobile phone on the primary service provider in block 514, and the methodology terminates. In another embodiment of the present invention, when the borrower is not subscribed to an associated secondary service provider, the methodology may contact a general payment provider as illustrated in FIG. 4. If the borrower is subscribed to an associated secondary service provider, the usage information is sent to the secondary service provider and attributed to an account of the borrower on the secondary service provider in block 516, and the methodology terminates.

Figure 6:
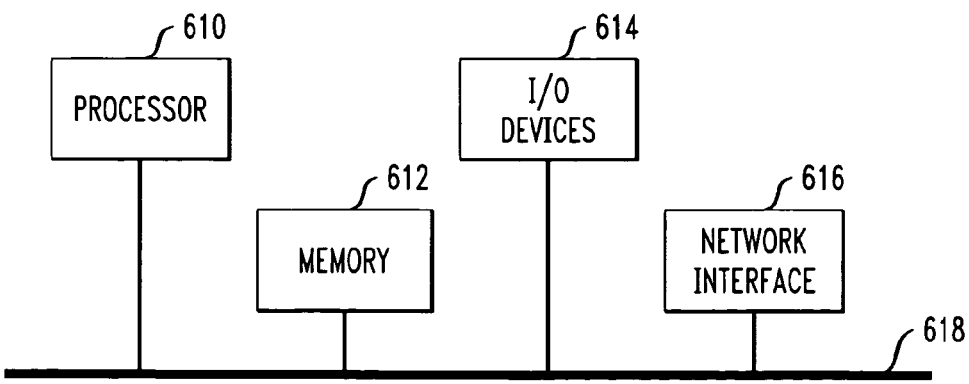
FIG. 6 is a diagram illustrating an illustrative hardware implementation of a computing system in accordance with which one or more components/methodologies of the present invention may be implemented, according to an embodiment of the present invention.

Referring now to FIG. 6, a block diagram illustrates an illustrative hardware implementation of a computing system in accordance with which one or more components/methodologies of the invention (e.g., components/methodologies described in the context of FIGS. 1-5) may be implemented, according to an embodiment of the present invention. For instance, such a computing system in FIG. 6 may implement primary service provider 110, 210, 310, 410, secondary service provider 116, 416, user directory server 328, or general payment provider 430 of FIGS. 1-4.

As shown, the computer system may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices for entering data to the processing unit, and/or one or more output devices for presenting results associated with the processing unit. User identification information from mobile phone 104 of FIG. 1 may be provided in accordance with one or more of the I/O devices.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for providing flexible communication device usage attribution comprising the steps of:
   receiving identification information of a user of a communication device from the communication device at a primary service provider;
   determining if the user of the communication device is an owner of the communication device at the primary service provider;

attributing usage information to an account of the owner on the primary service provider when the user is identified as the owner;

attributing usage information to an account of the user when the user is not identified as the owner and the user is subscribed to one of the primary service provider and a service provider associated with the primary service provider, wherein the step of attributing usage information comprises the steps of determining if the user is subscribed to the primary service provider, attributing usage information to the account of the user on the primary service provider when the user is subscribed to the primary service provider, determining if the user is subscribed to the service provider associated with the primary service provider when the user is not subscribed to the primary service provider, and sending usage information to the service provider associated with the primary service provider when the user is subscribed to the service provider associated with the primary service provider; and providing one or more personal settings of the user on the communication device, wherein the step of providing one or more personal settings comprises the steps of downloading one or more personal settings of the user from the service provider associated with the primary service provider to the primary service provider when the user is subscribed to the service provider associated with the primary service provider, and transmitting the one or more personal settings of the user from the primary service provider to the communication device.

2. The method of claim 1, wherein, in the steps of receiving identification information and determining if the user of the communication device is an owner, the communication device comprises a mobile phone.

3. The method of claim 1, wherein the steps of receiving identification information, determining if the user is an owner, attributing usage information to an owner, and attributing usage information to a user, are repeated for each additional user on each additional communication device during a call.

4. The method of claim 1, wherein the steps of receiving identification information, determining if the user is an owner, attributing usage information to an owner, and attributing usage information to a user, are repeated for each additional user of the communication device during a call.

5. The method of claim 1, further comprising the step of attributing usage information to the account of the owner when the user is not able to be identified.

6. The method of claim 1, wherein, in the step of determining if the user is subscribed to a service provider associated with the primary service provider, the service provider associated with the primary service provider comprises a service provider having a contractual agreement with the primary service provider.

7. The method of claim 1, wherein, in the step of receiving identification information, the identification information comprises biometric information.

8. The method of claim 7, wherein, in the step of receiving identification information, the biometric information comprises a fingerprint.

9. The method of claim 7, wherein, in the step of receiving identification information, the biometric information comprises a voice of the user.

10. The method of claim 1, wherein, in the step of receiving identification information, the identification information comprises a personal code.

11. The method of claim 1, wherein the usage information comprises identification information, time of usage and length of usage.

12. The method of claim 1, further comprising the steps of:

communicating usage information and identification information to a general payment provider when the user is identified and the user is subscribed to a service provider that does not have a contractual agreement with the first service provider; and receiving payment from the general payment provider based on the usage information when usage information and identification information are communicated to the general payment provider, wherein the general payment provider is reimbursed by one of the service provider to which the user is subscribed and the user.

13. Apparatus for providing flexible communication device usage attribution, comprising:

a memory; and at least one processor coupled to the memory and operative to: (i) receive identification information of a user of a communication device from the communication device at a primary service provider; (ii) determine if the user of the communication device is an owner of the communication device at the primary service provider; (iii) attribute usage information to an account of the owner on the primary service provider when the user is identified as the owner; (iv) attribute usage information to an account of the user when the user is not identified as the owner and the user is subscribed to one of the primary service provider and a service provider associated with the primary service provider, wherein the attribute operation comprises the steps of determining if the user is subscribed to the primary service provider, attributing usage information to the account of the user on the primary service provider when the user is subscribed to the primary service provider, determining if the user is subscribed to the service provider associated with the primary service provider when the user is not subscribed to the primary service provider, and sending usage information to the service provider associated with the primary service provider when the user is subscribed to the service provider associated with the primary service provider; and (v) provide one or more personal settings of the user on the communication device, wherein the provide operation comprises the steps of downloading one or more personal settings of the user from the service provider associated with the primary service provider to the primary service provider when the user is subscribed to the service provider associated with the primary service provider, and transmitting the one or more personal settings of the user from the primary service provider to the communication device.

14. The apparatus of claim 13, wherein, in the operations of receiving identification information and determining if the user of the communication device is an owner, the communication device comprises a mobile phone.

15. The apparatus of claim 13, wherein, in the operation of determining if the user is subscribed to a service provider associated with the primary service provider, a service provider associated with the primary service provider comprises a service provider having a contractual agreement with the primary service provider.

16. The apparatus of claim 13, where the processor is further operative to:

communicate usage information and identification information to a general payment provider when the user is identified and the user is subscribed to a service provider that does not have a contractual agreement with the first service provider; and receive payment from the general payment provider based on the usage information when usage information and identification information are communicated to the general payment provider, wherein the general payment provider is reimbursed by one of the service provider to which the user is subscribed and the user.

17. A method for making a computer implemented process to enable flexible communication device usage attribution, the method comprising:

instantiating first computer instructions onto a computer readable medium, the first computer instructions configured to receive identification information of a user of a communication device from the communication device at a primary service provider;

instantiating second computer instructions onto a computer readable medium, the second computer instructions configured to determine if the user of the communication device is an owner of the communication device at the primary service provider;

instantiating third computer instructions onto a computer readable medium, the third computer instructions configured to attribute usage information to an account of the owner on the primary service provider when the user is identified as the owner;

instantiating fourth computer instructions onto a computer readable medium, the fourth computer instructions configured to attribute usage information to an account of the user when the user is not identified as the owner and the user is subscribed to one of the primary service provider and a service provider associated with the primary service provider, wherein the step of attributing usage information comprises the steps of determining if the user is subscribed to the primary service provider, attributing usage information to the account of the user on the primary service provider when the user is subscribed to the primary service provider, determining if the user is subscribed to the service provider associated with the primary service provider when the user is not subscribed to the primary service provider, and sending usage information to the service provider associated with the primary service provider when the user is subscribed to the service provider associated with the primary service provider; and instantiating fifth computer instructions onto a computer readable medium, the fifth computer instructions configured to provide one or more personal settings of the user on the communication device, wherein the providing of one or more personal settings comprises the steps of downloading one or more personal settings of the user from the service provider associated with the primary service provider to the primary service provider when the user is subscribed to the service provider associated with the primary service provider, and transmitting the one or more personal settings of the user from the primary service provider to the communication device.

18. A method for providing flexible communication device usage attribution comprising the steps of:

receiving identification information of a user of a communication device from the communication device at a primary service provider;

determining if the user of the communication device is an owner of the communication device at the primary service provider;

attributing usage information to an account of the owner on the primary service provider when the user is identified as the owner;

attributing usage information to an account of the user when the user is not identified as the owner and the user is subscribed to one of the primary service provider and a service provider associated with the primary service provider, wherein the step of attributing usage information comprises the steps of determining if the user is subscribed to the primary service provider, attributing usage information to the account of the user on the primary service provider when the user is subscribed to the primary service provider, determining if the user is subscribed to the service provider associated with the primary service provider when the user is not subscribed to the primary service provider, and sending usage information to the service provider associated with the primary service provider when the user is subscribed to the service provider associated with the primary service provider; and providing one or more personal settings of the user on the communication device, wherein the step of providing one or more personal settings comprises the steps of sending identification information to a user directory server comprising a plurality of personal settings of users having respective service providers associated with the primary service provider, receiving one or more personal settings of the user from the user directory server at the primary service provider, and transmitting the one or more personal settings from the primary service provider to the communication device.

19. A method for providing flexible communication device usage attribution comprising the steps of:

receiving identification information of a user of a communication device from the communication device at a primary service provider;

determining if the user of the communication device is an owner of the communication device at the primary service provider;

attributing usage information to an account of the owner on the primary service provider when the user is identified as the owner, wherein the step of attributing usage information comprises the steps of determining if the user is subscribed to the primary service provider;

attributing usage information to an account of the user when the user is not identified as the owner and the user is subscribed to one of the primary service provider and a service provider associated with the primary service provider, wherein the step of attributing usage information comprises the steps of determining if the user is subscribed to the primary service provider, attributing usage information to the account of the user on the primary service provider when the user is subscribed to the primary service provider, determining if the user is subscribed to the service provider associated with the primary service provider when the user is not subscribed to the primary service provider, and sending usage information to the service provider associated with the primary service provider when the user is subscribed to the service provider associated with the primary service provider; and providing one or more personal settings of the user on the communication device, wherein the step of providing one or more personal settings comprises the steps of sending identification information to a user directory server comprising a plurality of personal settings of users having service providers associated with the primary service provider, wherein the user directory server transmits one or more personal settings to the communication device.

20. Apparatus for providing flexible communication device usage attribution, comprising:

a memory; and at least one processor coupled to the memory and operative to: (i) receive identification information of a user of a communication device from the communication device at a primary service provider; (ii) determine if the user of the communication device is an owner of the communication device at the primary service provider; (iii) attribute usage information to an account of the owner on the primary service provider when the user is identified as the owner; (iv) attribute usage information to an account of the user when the user is not identified as the owner and the user is subscribed to one of the primary service provider and a service provider associated with the primary service provider, wherein the attribute operation comprises the steps of determining if the user is subscribed to the primary service provider, attributing usage information to the account of the user on the primary service provider when the user is subscribed to the primary service provider, determining if the user is subscribed to the service provider associated with the primary service provider when the user is not subscribed to the primary service provider, and sending usage information to the service provider associated with the primary service provider when the user is subscribed to the service provider associated with the primary service provider; and (v) provide one or more personal settings of the user on the communication device, wherein the provide operation comprises the steps of sending identification information to a user directory server comprising a plurality of personal settings of users having respective service providers associated with the primary service provider, receiving one or more personal settings of the user from the user directory server at the primary service provider, and transmitting the one or more personal settings from the primary service provider to the communication device.

* * * * *